United States Patent
Powell et al.

(10) Patent No.: US 9,892,528 B2
(45) Date of Patent: Feb. 13, 2018

(54) TEMPORAL DEPENDENCIES IN DEPENDENCY GRAPHS

(71) Applicant: DreamWorks Animation LLC, Glendale, CA (US)

(72) Inventors: Alexander P. Powell, Los Angeles, CA (US); Alex M. Wells, Tigard, OR (US)

(73) Assignee: DreamWorks Animation L.L.C., Universal City, CA (US)

( * ) Notice: Subject to any disclaimer, the term of this patent is extended or adjusted under 35 U.S.C. 154(b) by 448 days.

(21) Appl. No.: 13/958,518

(22) Filed: Aug. 2, 2013

(65) Prior Publication Data
US 2014/0035931 A1     Feb. 6, 2014

Related U.S. Application Data

(60) Provisional application No. 61/679,665, filed on Aug. 3, 2012.

(51) Int. Cl.
*G06F 3/00* (2006.01)
*G06T 11/20* (2006.01)
(Continued)

(52) U.S. Cl.
CPC ............ *G06T 11/20* (2013.01); *G06F 3/00* (2013.01); *G06T 13/20* (2013.01); *G06T 19/20* (2013.01); *G06T 2219/2016* (2013.01)

(58) Field of Classification Search
CPC ....... G06T 11/206; G06T 11/20; H04L 45/02; G06F 17/30595; G06F 3/00;
(Continued)

(56) References Cited

U.S. PATENT DOCUMENTS 6,266,053 B1    7/2001  French et al.
6,487,565 B1    11/2002 Schechter et al.
(Continued)

FOREIGN PATENT DOCUMENTS

CN    101916324 A    12/2010

OTHER PUBLICATIONS

International Search Report and Written Opinion received for PCT Patent Application No. PCT/US2013/053519, dated Feb. 14, 2014, 9 pages.
(Continued)

*Primary Examiner* — Gregory J Tryder
*Assistant Examiner* — Kwang Lee
(74) *Attorney, Agent, or Firm* — Dentons US LLP

(57) ABSTRACT

Systems and processes are described below relating to evaluating a dependency graph having one or more temporally dependent variables. The temporally dependent variables may include variables that may be used to evaluate the dependency graph at a frame other than that at which the temporally dependent variable was evaluated. One example process may include tracking the temporal dirty state for each temporally dependent variable using a temporal dependency list. This list may be used to determine which frames, if any, should be reevaluated when a request to evaluate a dependency graph for a particular frame is received. This advantageously reduces the amount of time and computing resources needed to reevaluate a dependency graph.

21 Claims, 9 Drawing Sheets

(51) Int. Cl.
*G06T 13/20* (2011.01)
*G06T 19/20* (2011.01)

(58) Field of Classification Search
CPC .. G06F 11/323; G06F 3/048; G06F 17/30899; G06F 2212/1028; G11B 27/105
USPC ........................................................ 345/473
See application file for complete search history.

(56) References Cited

U.S. PATENT DOCUMENTS

| | | | |
|---|---|---|---|
| 6,823,299 B1 | 11/2004 | Contreras et al. | |
| 7,408,550 B2 | 8/2008 | Bunnell | |
| 7,414,626 B1 | 8/2008 | Picott | |
| 7,536,401 B2 | 5/2009 | Bitonti et al. | |
| 7,577,554 B2 | 8/2009 | Lystad et al. | |
| 7,702,482 B2 | 4/2010 | Graepel et al. | |
| 8,228,339 B2 | 7/2012 | Brunner et al. | |
| 8,627,199 B1 * | 1/2014 | Handley | G06F 17/30899 715/234 |
| 2006/0210174 A1 | 9/2006 | Bevan | |
| 2008/0162205 A1 | 7/2008 | Gross | |
| 2010/0123723 A1 * | 5/2010 | Collard | G06T 13/40 345/473 |
| 2010/0214313 A1 * | 8/2010 | Herman | A63F 13/10 345/593 |
| 2013/0166507 A1 * | 6/2013 | Staczek | G06F 17/30575 707/625 |

OTHER PUBLICATIONS

International Preliminary Report on Patentability received for PCT Patent Application No. PCT/US2013/053519, dated Feb. 12, 2015, 8 pages.

Extended European Search Report received for European Patent Application No. 13826497.3, dated Dec. 22, 2015, 3 pages.

Office Action received for Chinese Patent Application No. 201380041346.X, dated May 2, 2017, 26 pages (13 pages of English Translation and 13 pages of Official copy).

* cited by examiner

Image 100

List 400

| Variable Name | Frame Number | Value | Temporal Dirty Flag |
|---|---|---|---|
| Wheel_position | 0 | 101 | 0 |
| Wheel_position | 1 | 105 | 0 |
| Wheel_position | 2 | 120 | 0 |
| Wheel_position | 3 | 150 | 0 |
| Wheel_position | 4 | 194 | 0 |
| Wheel_position | 5 | 232 | 0 |
| Wheel_position | 6 | 257 | 0 |
| Wheel_position | 7 | 281 | 0 |
| Wheel_position | 8 | 301 | 0 |
| Wheel_position | 9 | 317 | 0 |

FIG. 4

| Variable Name | Frame Number | Value | Temporal Dirty Flag |
|---|---|---|---|
| Wheel_position | 0 | 101 | 0 |
| Wheel_position | 1 | 105 | 0 |
| Wheel_position | 2 | 120 | 0 |
| Wheel_position | 3 | 150 | 0 |
| Wheel_position | 4 | 194 | 0 |
| Wheel_position | 5 | 232 | 0 |
| Wheel_position | 6 | 257 | 0 |
| Wheel_position | 7 | 281 | 0 |
| Wheel_position | 8 | 301 | 0 |
| Wheel_position | 9 | 317 | 0 |

List 600

FIG. 6

List
700

| Variable Name | Frame Number | Value | Temporal Dirty Flag |
|---|---|---|---|
| Wheel_position | 0 | 101 | 0 |
| Wheel_position | 1 | 105 | 0 |
| Wheel_position | 2 | 120 | 0 |
| Wheel_position | 3 | 150 | 0 |
| Wheel_position | 4 | 194 | 0 |
| Wheel_position | 5 | 232 | 0 |
| Wheel_position | 6 | 257 | 1 |
| Wheel_position | 7 | 281 | 1 |
| Wheel_position | 8 | 301 | 1 |
| Wheel_position | 9 | 317 | 1 |

FIG. 7

TEMPORAL DEPENDENCIES IN DEPENDENCY GRAPHS

CROSS-REFERENCE TO RELATED APPLICATIONS

This application claims priority to U.S. Provisional Application No. 61/679,665 filed with the U.S. Patent and Trademark Office on Aug. 3, 2012, the entire contents of which are hereby incorporated by reference.

BACKGROUND

1. Field

The present disclosure relates generally to computer-generated animation and, more specifically, to evaluating a dependency graph having one or more temporally dependent variables.

2. Related Art

Media productions typically use dependency graphs to render, animate, or otherwise describe a scene in an animation. These dependency graphs may be made up of interconnected nodes, each of which may be a standalone computation unit that takes in data via one or more input attributes, performs some computation on the data, and produces one or more output attributes. The edges connecting nodes in the graph may represent data flowing from one node to the next, with each node performing some computation on the data it receives to generate its output. A node may have any number of inputs and any number of outputs, as well as other attributes. By varying the input attributes that feed into the nodes, an animator can control the motion, location, and other visual effects of an object or a scene.

As media productions create more realistic animations, the complexity and the number of nodes in the dependency graphs used to support these animations also increases. For example, the graph describing a character may become larger and more complex as the character is enhanced to include visual elements and movements that are more realistic. It is not uncommon for a dependency graph having thousands of nodes to be used to animate a single frame of an animated film. As such, the time and computing resources required to process these dependency graphs can be considerable.

These processing delays can be particularly expensive and problematic during production. For example, a dependency graph for a shot may include thousands of nodes representing the characters and other assets that are to be displayed in the shot. An animator may configure the inputs to various nodes within the dependency graph to cause the character to move in a desired manner. Once the inputs are configured, the graph may be evaluated to determine the outputs of the dependency graph for a certain number of frames. Depending on the number of frames being calculated, the animator may be required to wait a significant length of time before the output of the dependency graph becomes available. The animator may then review the resulting images to determine if the inputs provided to the dependency graph produced the desired result. If the animator is not satisfied with the result, the animator may modify the inputs to the dependency graph and the graph may again be evaluated. This iterative process may be performed hundreds of times or more until a desired output is obtained.

The processing delays may be even more problematic when the graph includes nodes that depend on the output of other nodes at different times. For example, a node configured to determine how much a wheel should rotate may receive the horizontal position of the wheel from the previous frame and the horizontal position of the wheel in the present frame as inputs. Calculations may then be performed based on the linear distance traveled and the radius of the wheel to determine the wheel's rotation. Thus, these temporally dependent nodes may depend on both the outputs of nodes within the graph, as well as outputs of nodes within the graph from different frames. Unfortunately, conventional animation systems have no way of tracking these temporal dependencies. As a result, if an animator changes an input value for any node within the dependency graph, the graph must be evaluated from the first frame of the shot to the desired frame. For example, if the animator only changes an input at frame 70 of a shot spanning from frames 0-100, to evaluate the $71^{st}$ frame, the graph may be required to be evaluated for frames 0-71.

SUMMARY

Processes for evaluating a dependency graph having one or more temporally dependent variables are described. One example process may include receiving, by a processor, a request to evaluate the dependency graph for a requested frame of an animation; identifying a dirty value of the temporally dependent variable for a frame used to evaluate the dependency graph for the requested frame based on a temporal dependency list, wherein the temporal dependency list comprises a list of values of the temporally dependent variable determined by previous or future evaluations of the dependency graph; evaluating the identified dirty value; updating the list of values of the temporal dependency list based on the evaluation of the identified dirty value; and evaluating the dependency graph at the requested frame based at least in part on the updated list of values of the temporal dependency list.

In some examples, the temporal dependency list may include a temporal dirty flag for each value in the list of values. In other examples, identifying the dirty value may include parsing the temporal dependency list to identify a value in the list of values comprising a set temporal dirty flag. In yet other examples, updating the list of values of the temporal dependency list may include: storing a result of the evaluating of the identified dirty value in the temporal dependency list; and resetting a temporal dirty flag for the identified dirty value.

In some examples, evaluating the identified dirty value may exclude evaluating non-dirty values for the frame used to evaluate the dependency graph for the requested frame.

In some examples, the temporally dependent variable may be identified as being a temporally dependent variable by one or more nodes in the dependency graph.

In some examples, the method may further include, before receiving the request to evaluate the dependency graph at the requested frame: identifying the temporally dependent variable; generating the temporal dependency list; evaluating the dependency graph for one or more frames; and storing values of the temporally dependent variable resulting from the evaluating of the dependency graph for one or more frames in the temporal dependency list.

Systems and computer-readable storage media for evaluating a dependency graph having one or more temporally dependent variables are also described.

BRIEF DESCRIPTION OF THE FIGURES

The present application can be best understood by reference to the following description taken in conjunction with the accompanying drawing figures, in which like parts may be referred to by like numerals.

FIG. 4 illustrates an exemplary temporal dependency list according to various examples.

FIG. 6 illustrates an exemplary temporal dependency list according to various examples.

FIG. 7 illustrates an exemplary temporal dependency list according to various examples.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

For descriptive purposes, throughout this disclosure, software, software modules, software objects, and the like may be described as performing various functions. One of ordinary skill in the art, however, will recognize that software may not actively perform any function and instead may include instructions that are executable on a computer processor. As such, although software may be described herein as performing a function, it should be appreciated that a computer processor or other computing device may typically perform those functions attributed herein to software modules or objects by executing computer instructions provided by the software modules or objects.

Systems and processes are described below relating to evaluating a dependency graph having one or more temporally dependent variables. The temporally dependent variables may include variables that may be used to evaluate the dependency graph at a frame other than that at which the temporally dependent variable was evaluated. One example process may include tracking the temporal dirty state for each temporally dependent variable using a temporal dependency list. This list may be used to determine which frames, if any, should be reevaluated when a request to evaluate a dependency graph for a particular frame is received. This advantageously reduces the amount of time and computing resources needed to reevaluate a dependency graph.

Figure 1:
FIG. 1 illustrates an exemplary rendered image that may be generated using a process for evaluating a dependency graph having temporal dependencies according to various examples.

FIG. 1 depicts an exemplary computer-generated image 100 that may be rendered using a process for evaluating a dependency graph having temporal dependencies according to various examples. Notably, FIG. 1 depicts a character whose features may depend on a current position of the character's skeleton as well as the position of the character's skeleton from a previous frame.

Figure 2:
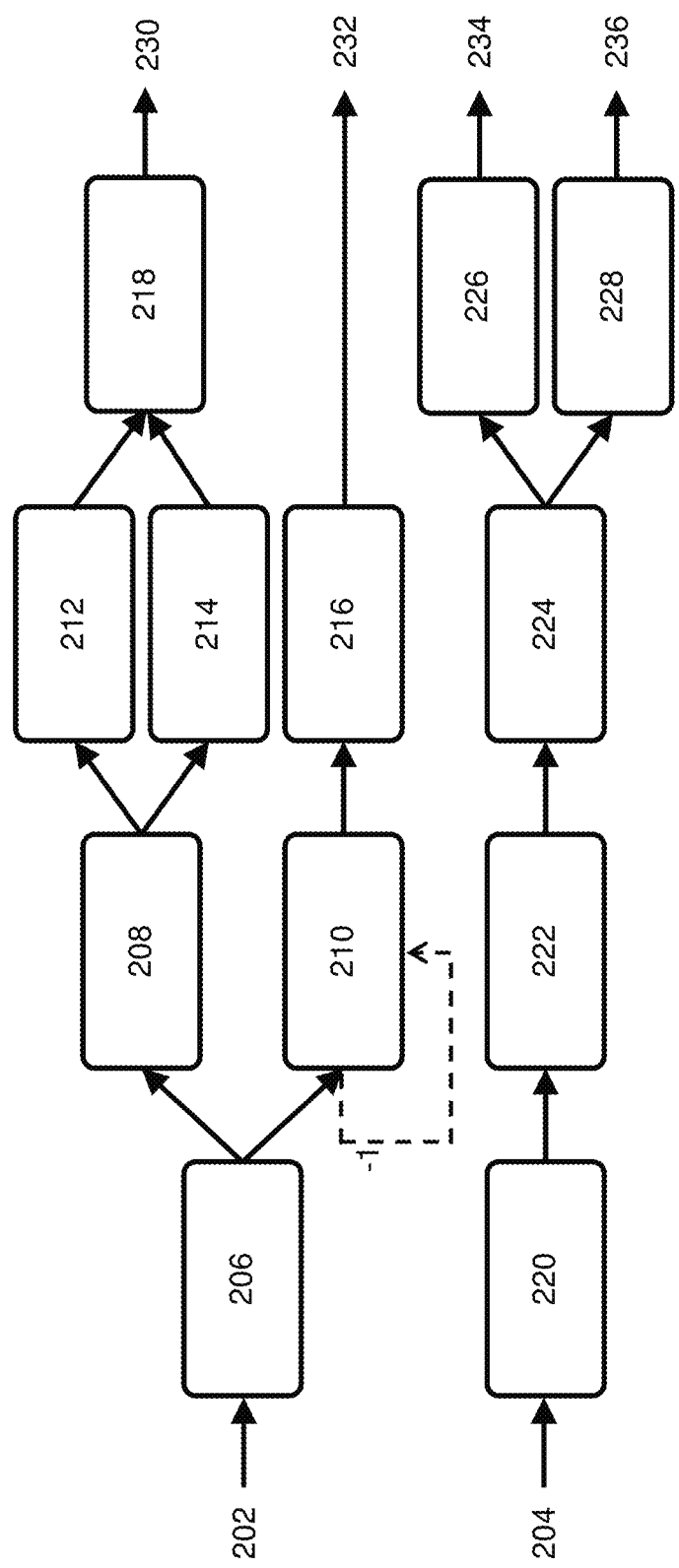
FIG. 2 illustrates an exemplary dependency graph having temporal dependencies according to various examples.

As mentioned above, a dependency graph having interconnected nodes, each of which may be a standalone computation unit, may be used to render, animate, or otherwise describe a scene in an animation. For example, FIG. 2 illustrates an exemplary dependency graph 200 that may be used to generate a computer-generated animation scene like that shown in FIG. 1. Dependency graph 200 may include inputs 202 and 204 to the graph that may be, for example, data describing the movement of a character, the position of an animated object, the background of a scene, a change in time, or any of a variety of characteristics upon which nodes 206 and 220 are to perform computations to produce output attributes. Graph 200 may further include outputs 230, 232, 234, and 236 that may represent, for example, an image of the scene at a particular frame/time. Thus, a single evaluation of graph 200 may be performed to produce an image, 3D geometry, or other representative form for a frame of an animation. Graph 200 may be evaluated numerous times, with each evaluation producing outputs 230, 232, 234, 236 for a different frame, in order to produce a computer-generated animation.

As shown, dependency graph 200 may include multiple nodes (e.g., nodes 206, 208, 210, 212, 214, 216, 218, 220, 222, 224, 226, and 228) interconnected by edges. Each node may represent a computational operation to be performed on the data received at the input of the node to produce the data at the output of the node. The edges may be directional and may indicate the direction of the flow of data between nodes. For example, node 206 may be a node that determines a position of a wheel of a car based on a time input 202. The position determined by node 206 may be provided to nodes 208 and 210, which may in turn generate output attributes based on the position determined by node 206. Thus, nodes 208 and 210 may be said to be dependent on the output of node 206.

In addition to data dependencies within graph 200, some nodes may depend on final or intermediate data values that were calculated for previous frames of a scene. For instance, continuing with the example provided above, node 210 may be a node configured to determine how much a wheel should rotate based on a current position of the wheel received from node 206 and a previous position of a wheel calculated by node 206 in a previous evaluation of graph 200 for a previous frame. Based on the difference in positions, node 210 may calculate and output a rotation angle for the wheel and provide this rotation angle to node 216. Since node 210 required the use of the position of the wheel from a previous frame, the wheel position variable (e.g., "wheel_position") output by node 206 may be considered to be a "temporally dependent variable." Generally, these temporally dependent variables may include variables that may be used to evaluate the dependency graph at a frame other than that at which the temporally dependent variable was evaluated. The temporally dependent variable input to node 210 is represented in FIG. 2 by the dotted arrow exiting and reentering node 210. A temporal offset value of −1 is also shown, indicating the frame offset of the temporally dependent variable. For example, a value of −1 may indicate that the value from the previous frame may be used. While a negative value is shown, it should be appreciated that positive temporal offset value (e.g., a value of +1 indicating the use of the value from the subsequent frame) may be used as well.

As discussed above, since graph 200 includes temporally dependent variables, if a user desires to calculate an output of graph 200 for frame 100 using a conventional animation system, graph 200 must be evaluated for each of frames 0-99 prior to evaluating graph 200 for frame 100. This can require large amounts of time and computer resources. To reduce the amount of computation required to reevaluate graphs having temporal dependencies, an evaluation process 300 shown in FIG. 3 may be used along with a temporal dependency list similar to that shown in FIG. 4.

Figure 3:
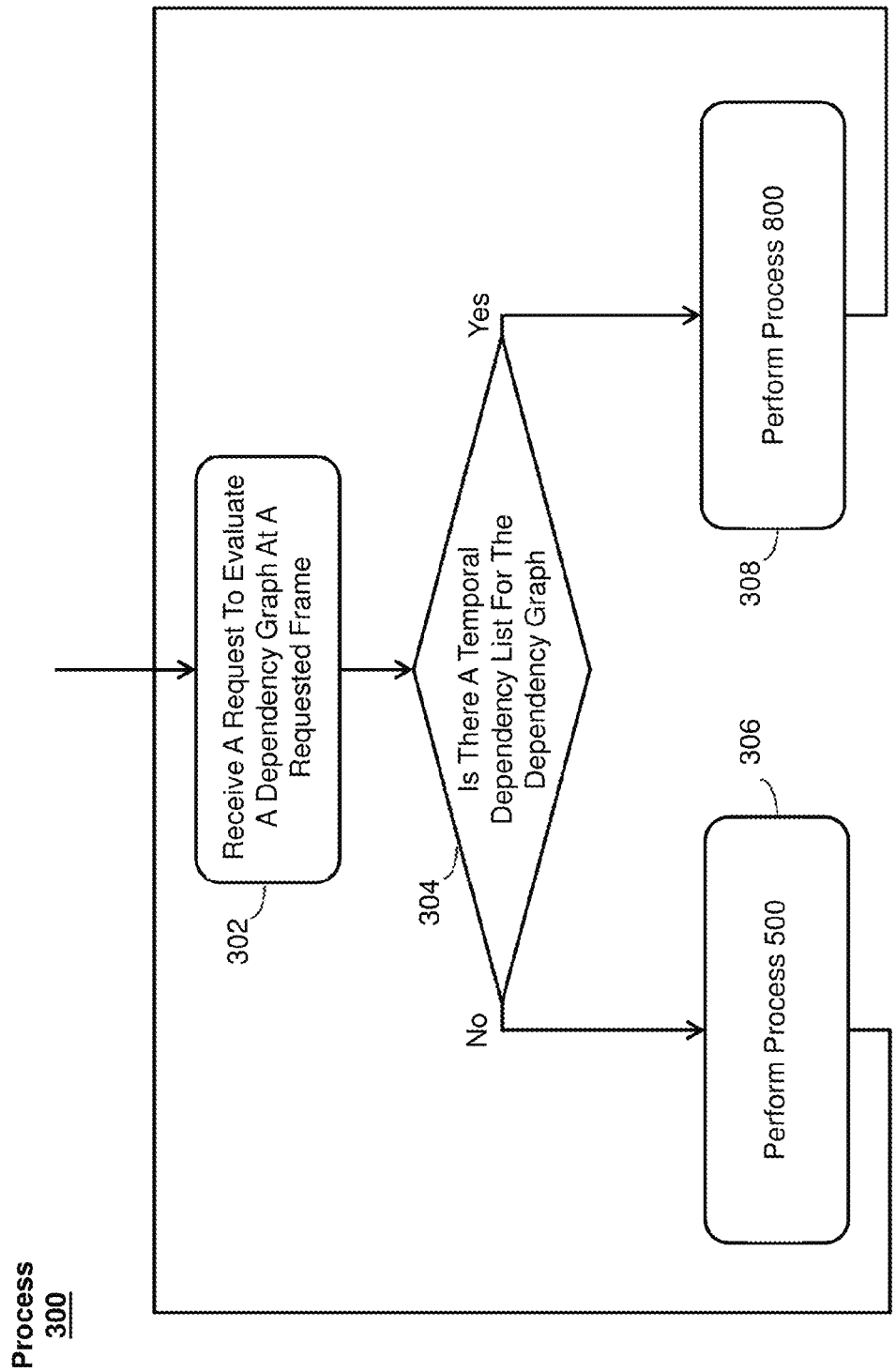
FIG. 3 illustrates an exemplary process for evaluating a dependency graph having temporal dependencies according to various examples.

In particular, FIG. 3 illustrates an exemplary process for evaluating a dependency graph having temporal dependencies according to various examples. At block 302, a request may be received to evaluate a dependency graph for a particular frame. The dependency graph may be similar or identical to graph 200 and may include any number of nodes interconnected by edges. The request may include a request to evaluate the dependency graph for one or more frames of a shot. A frame identifier may be used to identify the frame to be evaluated. For example, the frame identifier may include a numerical value of the frame within a particular shot (e.g., frame X of shot Z), may include a numerical value of the frame within an entire computer-generated animation (e.g., frame Y), a time associated with the frame, or any other desired identifier. After the request is received at block 302, the process may then proceed to block 304.

To illustrate, a request may be received from a user at block 302 to render the first 10 frames of an animation by evaluating graph 200 for each of these frames.

At block 304, it may be determined if a temporal dependency list for the dependency graph requested at block 302 exists or has been generated. The temporal dependency list may include one or more data structures storing variable identifiers, values for the identified variables at one or more frames, a frame identifier associated with each stored value, and a temporal dirty flag. The variable identifier may include any identifier for a temporally dependent variable (e.g., any input or output within a dependency graph) that may be used by the dependency graph during a frame other than that at which the temporally dependent variable was evaluated (e.g., a value of a variable to be used when evaluating the dependency graph for a future or previous frame). The values of these temporally dependent variables for each calculated frame may also be stored in the temporal dependency list along with the associated frame. The temporal dirty flag may indicate whether the stored value is currently valid or potentially invalid. This temporal dirty flag is separate from the dirty flags assigned to input/output attributes of a dependency graph within the same evaluation run. In contrast, temporal dirty flags may indicate whether or not an attribute is valid for a particular frame. For example, node 206 may process input 202 to output the "wheel_position" value for a first frame. To compute a second frame, input 202 may change to a value corresponding to the second frame. As a result, the output attribute of node 206 may be flagged as dirty using a conventional dirty flag. The previously calculated "wheel_position," however, may not be marked temporally dirty since it still represents the correct position of the wheel for the first frame.

FIG. 4 illustrates a graphical representation of an example temporal dependency list for graph 200. In this example, the first column of the list contains the variable identifier of the temporally dependent value "wheel_position" output by node 206 of graph 200. The second column includes the frame identifier in the form of a frame number for values of "wheel_position" that have been calculated. The third column includes calculated values for "wheel_position" at the indicated frame numbers. For example, "wheel_position" has been determined to have a value of 150 for frame 3 for this particular shot. The fourth column includes a temporal dirty flag for each variable identifier-frame identifier-value combination. A value of 0 (alternatively, 1) may indicate that the value for the identified variable and frame is not dirty and can be used by other nodes. A value of 1 (alternatively, 0), may indicate that the value for the identified variable and frame is dirty and should be recomputed before being used. While only one variable identifier has been included in list 400, it should be appreciated that list 400 may include any number of identifiers corresponding to some or all temporally dependent variables in graph 200. Alternatively, separate temporal dependency lists may be used for each temporally dependent variable. For simplicity, it has been assumed that graph 200 includes only one temporally dependent variable (e.g., "wheel_position").

Figure 5:
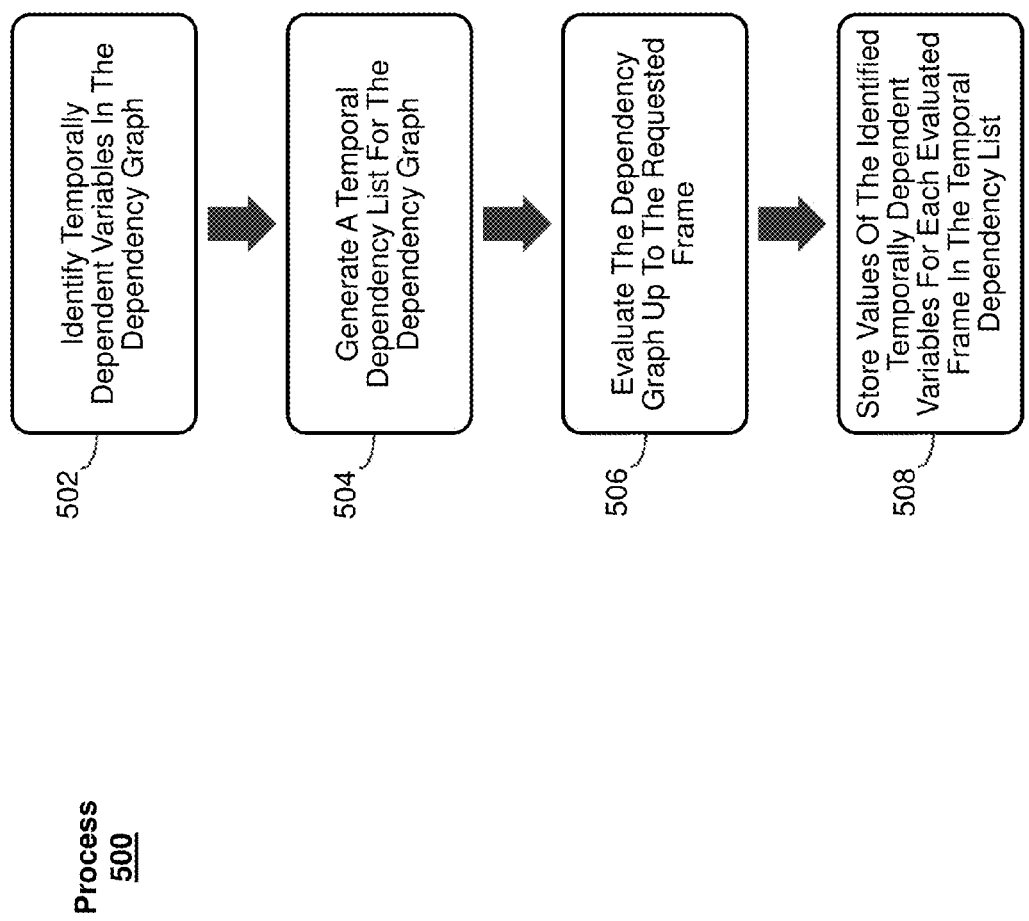
FIG. 5 illustrates an exemplary process for evaluating a dependency graph having temporal dependencies according to various examples.

Referring back to FIG. 3, if it is determined at block 304 that no temporal dependency list exists or has been generated for the dependency graph, the process may proceed to block 306, where process 500 shown in FIG. 5 may be performed. This may occur, for example, during the first evaluation of the graph since the temporal dependency list may be generated during the first evaluation of the graph.

Referring now to FIG. 5, if no dependency graph was generated for the dependency graph, block 502 of process 500 may be performed. Generally, process 500 may be performed during a first evaluation of a dependency graph or after an alteration to the structure of the graph or one of its nodes has occurred. At block 502, temporally dependent variables in the dependency graph may be identified. In some examples, this may be performed by parsing through each node of the dependency graph to identify any variables that are used as an input to a node in a different (e.g., future or previous) frame and their temporal offsets (e.g., −2, −1, +1, +2, etc.). Additionally, the graph's topology may be examined to identify which nodes with temporal dependencies have outputs connected directory or indirectly (e.g., a series of connected nodes could exist between them) to temporal inputs on another node. When the graph is evaluated for a temporal input, all nodes with temporal dependencies that feed into that input may be satisfied first. Using the wheel rotation example provided above, if a string were stuck to the tire of the wheel, the wheel's rotation must be calculated before simulating the string's movement.

To illustrate, continuing with the example above, to compute a rotation for a wheel at frame 2, node 210 may receive the "wheel_position" output by node 206 for frame 2 as well as the "wheel_position" output by node 206 for frame 1 (e.g., (requested frame+temporal offset)=(frame 2+−1)=frame 1). Thus, "wheel_position" may be identified as a temporally dependent variable.

In other examples, a programmer defining each node of the graph may explicitly identify variables that are temporally dependent. For example, a programmer creating node 210 may include a tag, such as "TEMPORAL SOURCE," and a frame offset value (e.g., −1) when declaring the input requiring the value of "wheel_position" from the previous frame. A parsing of each node of the dependency graph may be performed to identify the variables having a similar or identical temporal dependency tags.

At block 504, a temporal dependency list for the dependency graph may be generated. This may include creating an instance of the temporal dependency list, reserving space in memory for the list, or other similar operation. In some examples, entries for each temporally dependent variable identified at block 502 and for each frame of a shot may be added to the temporal dependency list. In these examples, the entries for each temporally dependent variable and for each frame may be set to any value and the temporal dirty flags for these values may be set to 1 (indicating that the values are dirty). In other examples, the list may be left empty at the time of generation.

At block 506, the dependency graph may be evaluated up to and potentially including the frame requested at block 302 of process 300. For example, if a request was received at block 302 to render the first 10 frames of an animation by evaluating graph 200 for each of these frames, graph 200 may be evaluated 10 times to generate outputs for each of frames 0-9. In situations where the temporally dependent variable includes a positive temporal offset, the graph may be evaluated backwards from the end of the frame range towards the requested frame range. For example, if the animation was made up of 200 frames, graph 200 may be evaluated from frames 200-10 before evaluating the requested frames.

At block 508, the values of the temporally dependent variables identified at block 502 for each frame evaluated at block 506 may be stored in the temporal dependency list generated at block 504. For example, FIG. 6 shows an example temporal dependency list 600 that may result from the performance of block 508. List 600 includes the variable identifier for the temporally dependent variable identified at block 502 and the values and frame identifiers for the temporally dependent variable determined at block 506. Additionally, since the stored values were recently calculated and because no changes have been made to graph 200, the temporal dirty flags for each stored variable identifier-frame identifier-value combination has been set to 0 (not dirty).

Once block 508 is complete, the process may return back to block 302 of process 300 to wait for another request to evaluate the dependency graph. Once a temporal dependency list has been generated for a dependency graph, the list may be stored for any desired length of time. For example, the list may be stored until a modification to the structure (e.g., nodes and/or edges included with the graph) or to a node (e.g., inputs and/or outputs of a node) within the graph is made. In other examples, the list may be stored for a threshold length of time, for a length of a session of the user, or any other desired length of time.

Additionally, changes to the temporally dependent variables can be tracked in the temporal dependency list. For example, if, after evaluating graph 200 for frames 0-9, an animator determines that the resulting animation output was unsatisfactory, the animator may change a value of input 202 for a particular frame (e.g., frame 6), resulting in a potential change in the value of "wheel_position" output by node 206 at the particular frame and any subsequent frames. Since the temporal offset for this variable is negative, the temporal dirty flags for the frame and any subsequent frames may be set to 1, as shown in FIG. 7. However, it should be appreciated that the determination of which frames of the temporal dependency list should have their temporal dirty flag set to 1 may be determined based on the frame at which an input was changed and whether the frame offset of the temporal dependency is positive or negative. If the frame offset is negative (indicating the use of the variable in future frames), frames subsequent to the frame at which the input was changed may be flagged as dirty. If, however, the frame offset is positive (indicating the use of the variable in previous frames), frames prior to the frame at which the input was changed may be flagged as dirty.

Returning to block 304 of FIG. 3, if it is instead determined that a temporal dependency list exists or has been generated for the dependency graph, the process may instead proceed to block 308 where process 800 may be performed. This may occur, for example, if the dependency graph has been previously evaluated.

To illustrate, continuing with the example using graph 200 provided above, a request to re-render the first 10 frames of the animation by evaluating graph 200 for each of these frames may be received at block 302 after the user has changed the value of input 202 for frame 6. Once received, the process may proceed to block 304, where it may be determined whether or not a temporal dependency list for graph 200 exists or has been generated. Since temporal dependency list 600 was previously generated at block 504 of process 400 and subsequently modified to generate temporal dependency list 700, it may be determined at block 304 that a temporal dependency list 700 for graph 200 has been generated. As such, the process may proceed to block 308.

Figure 8:
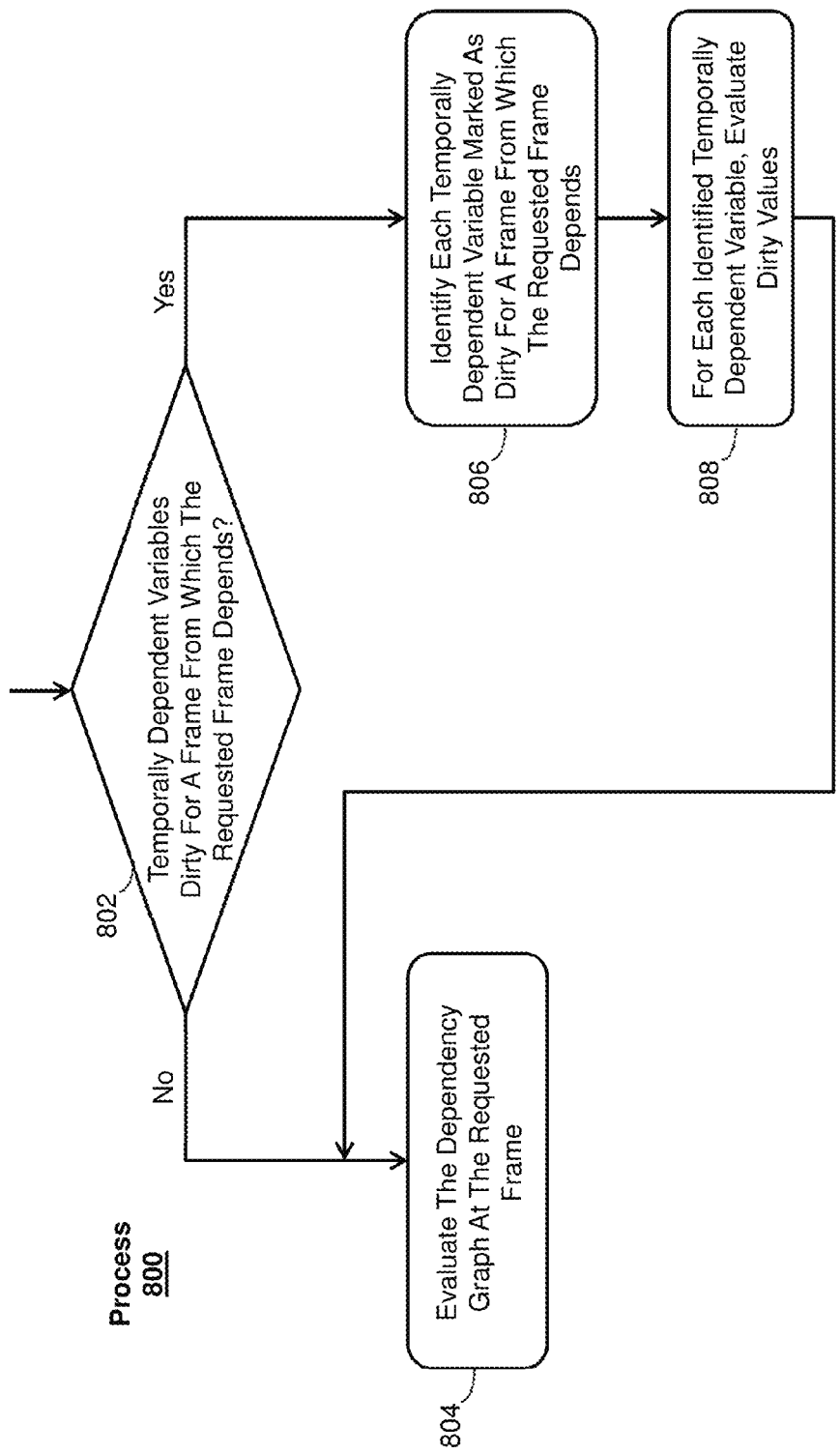
FIG. 8 illustrates an exemplary process for evaluating a dependency graph having temporal dependencies according to various examples.

At block 308, process 800 shown in FIG. 8 may be performed. Generally, process 800 may be performed to reevaluate a graph after one or more inputs to the graph have been changed. At block 802 of process 800, it may be determined whether the temporal dependency list includes a dirty flag for a temporally dependent variable at a frame from which the frame requested at block 302 depends. This may include parsing the temporal dependency list to determine if any value marked temporally dirty is required by the requested frame. In some examples, the absence of a value for a temporally dependent variable for a particular frame that is marked as being clean may be interpreted as being dirty. For example, if a temporal dependency list was generated and populated at blocks 504 and 506 of process 500 for frames 0-5, the temporal dependency list may only include entries for these frames. If a request is made to evaluate the graph at frame 9, the absence of entries for frames 6-8 may be interpreted as the values for frames 6-8 being dirty. If it is determined that there are no temporally dependent variables that are dirty prior to the requested frame, the process may proceed to block 804.

To illustrate, if a request was received at block 302 to evaluate graph 200 at frame 5, temporal dependency list 700 may be parsed to determine if the list contains a value marked temporally dirty for a frame that is required to evaluate the requested frame 5. Since the temporal offset value is negative, this may include determining if the list contains a value marked temporally dirty for a frame prior to the requested frame 5. In this example, the temporal dependency list does not include a dirty flag for the values of "wheel_position" prior to frame 5. Additionally, there are values marked as clean for each of the frames leading up to frame 5 (e.g., frames 0-4 are marked as being not temporally dirty). Thus, the process may proceed to block 804.

At block 804, the dependency graph may be evaluated for the requested frame. In some examples, this may include performing the operations associated with the nodes of the dependency graph using input values associated with the requested frame. In these examples, requested values of a temporally dependent variable may be obtained from the temporal dependency list. For example, if a request was received at block 302 to evaluate graph 200 at frame 5, graph 200 may be evaluated using the values of inputs 202 and 204 for frame 5. Additionally, since node 210 may need the value of "wheel_position" output by node 206 for frame 4, the value of "wheel_position" for frame 4 from the temporal dependency list 700 (e.g., 194) may be used.

If, however, it is instead determined at block 802 that there is a temporally dependent variable that is dirty and required by the requested frame, the process may instead proceed to block 806.

To illustrate, if a request to evaluate dependency graph 200 at frame 9 was received at block 302 and if temporal dependency list 700 is the temporal dependency list for graph 200, temporal dependency list may be parsed to determine if the list contains a value marked temporally dirty for a frame that is required by the requested frame 9. Since the temporal offset value is negative, this may include determining if the list contains a value marked temporally dirty for a frame prior to the requested frame 9. In this example, the temporal dependency list does include a dirty flag for the values of "wheel_position" at frames 6-9. Thus, the process may proceed to block 806.

At block 806, each temporally dependent variable marked as being dirty and required by the requested frame may be identified. This may be performed by parsing through the temporal dependency list to identify the variables having a value marked as being dirty that is required by the requested frame. In some examples, this may include iteratively identifying required data for each dirty entry in the temporal dependency list. For example, if frame 9 requires temporal data from frame 8, temporal dependencies may be satisfied for frame 8 before calculating frame 9. Once identified, the process may proceed to block 808.

To illustrate using the example provided above, list 700 may be parsed at block 806 and the "wheel_position" variable may be identified as having a value marked as dirty at a frame (e.g., frame 6, 7, 8) prior to the requested frame 9 (this temporally dependent variable may have a temporal offset of −1, meaning it needs a value from a previous frame). In this example, to compute the temporal input at frame 9, temporal data from frame 8, which is marked dirty in temporal dependency list 700, is needed. As such, both the frame (e.g., 8) and variable (e.g., "wheel_position" at frame 8) may be identified as needing to be evaluated. In some examples, the frames and variables needing to be evaluated can be added to an evaluation list. This process may be repeated until there are no more required temporal dependencies, the result of applying a temporal offset goes outside the boundary of the range of possible frames, or temporal dependency list 700 has non-dirty entries for all required dependencies. While the temporal dependency list only includes one temporally dependent variable in this example, it should be appreciated that the list may include any number of temporally dependent variables and each of those variables may be identified at block 806.

At block 808, temporally dependent variables identified at block 806 may be reevaluated for frames having dirty values. This may be performed by parsing through the temporal dependency list to identify the lowest frame value marked as dirty (for negative temporal offsets, or highest for positive temporal offsets) for each temporally dependent variable identified at block 806. Each temporally dependent variable may then be reevaluated by evaluating the portions of the dependency graph required to evaluate the temporally dependent variable starting at their earliest dirty frame and up to, but excluding the requested frame for negative temporal offsets. Alternatively, each temporally dependent variable may then be reevaluated by evaluating the portions of the dependency graph required to evaluate the temporally dependent variable starting at their last dirty frame and up to, but excluding the requested frame for positive temporal offsets. The results of the reevaluations may be stored in the temporal dependency list and the dirty flags for those values may be reset to 0.

In some examples, not all temporal dependency variables may be evaluated at the same time. For instance, some dependencies may feed others or some may require values from the future that are not valid in the temporal dependency list. In these examples, only temporal inputs that have their own temporal dependencies marked as valid may be evaluated. Evaluations in the forward and/or backward direction over the frame range of the identified temporally dependent variables needing evaluation may be performed, with each pass evaluating all the variables that have their own dependencies marked as valid. Eventually all will succeed in having valid dependencies and can be evaluated themselves. The process may then proceed to block 804.

To illustrate, continuing with the example above, list 700 may be parsed at block 806 and frame 6 may be identified as being the earliest frame at which the "wheel_position" variable has been marked as being dirty. Thus, values of the "wheel_position" variable may be reevaluated for frames 6-8 by performing the operation associated with node 206 for the values of input 202 for each of frames 6-8. The result of these three operations may be stored in temporal dependency list 700 and the temporal dirty flags for "wheel_position" values of frames 6-8 may be reset to 0. The process may then proceed to block 804.

At block 804, the dependency graph may be evaluated at the requested frame using values stored in the temporal dependency list as discussed above.

Using processes 300, 500, and 800 advantageously reduces the amount of time and computer resources required to reevaluate a dependency graph when a temporal dependency variable is modified. Using conventional systems, once a value was changed for a frame (e.g., change made to frame 6), the dependency graph would have been evaluated for all frames leading up the requested frame, even if the change had occurred for a frame subsequent to the requested frame. However, as discussed and illustrated above, using processes 300, 500, and 800, only the portions of the dependency graph needed to recompute temporal dependency variables that have been changed for frames prior to a requested frame may be evaluated. Additionally, using these processes allows complex nested simulations whose correct results are only achievable by evaluating over the frame range multiple times, because the results of one simulation feed another. The processes reduce the number of evaluations and portion of the dependency graph being evaluated to a minimum.

Figure 9:
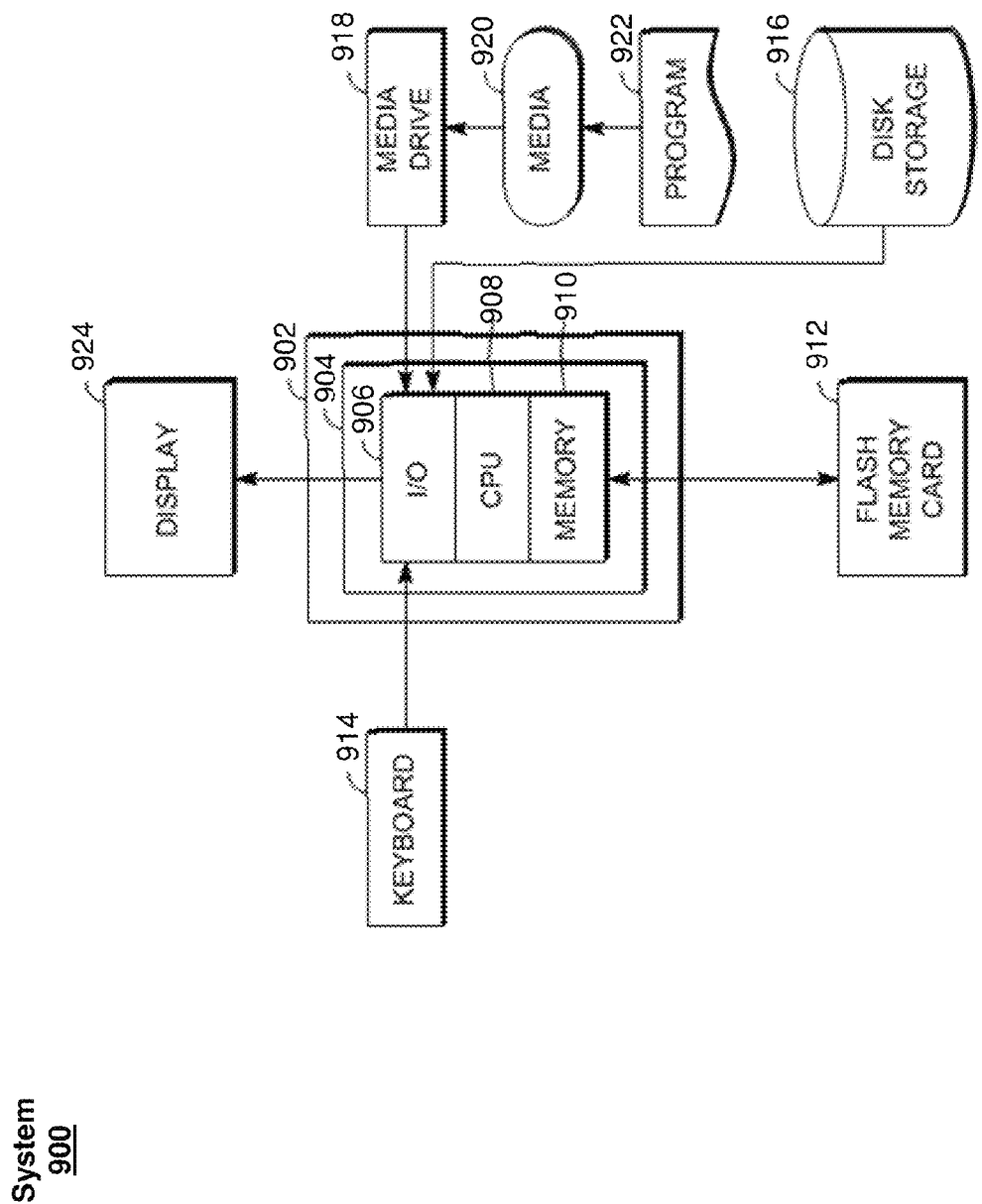
FIG. 9 illustrates an exemplary computing system.

FIG. 9 depicts an exemplary computing system 900 with a number of components that may be used to perform the above-described processes. The main system 902 includes a motherboard 904 having an input/output ("I/O") section 906, one or more central processing units ("CPU") 908, and a memory section 910, which may have a flash memory card 912 related to it. The I/O section 906 is connected to a display 924, a keyboard 914, a disk storage unit 916, and a media drive unit 918. The media drive unit 918 can read/write a computer-readable medium 920, which can contain programs 922 or data.

At least some values based on the results of the above-described processes can be saved for subsequent use. Additionally, a non-transitory computer-readable storage medium can be used to store (e.g., tangibly embody) one or more computer programs for performing any one of the above-described processes by means of a computer. The computer program may be written, for example, in a general-purpose programming language (e.g., Pascal, C, C++) or some specialized application-specific language.

Various exemplary embodiments are described herein. Reference is made to these examples in a non-limiting sense. They are provided to more broadly illustrate applicable aspects of the disclosed technology. Various changes may be made and equivalents may be substituted without departing from the true spirit and scope of the various embodiments. In addition, many modifications may be made to adapt a particular situation, material, composition of matter, process, process act(s), or step(s) to the objective(s), spirit, or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments.

What is claimed is:

1. A method for evaluating a dependency graph having a temporally dependent variable that is used to evaluate the dependency graph for a frame other than that at which the temporally dependent variable was evaluated, the method comprising:
    receiving, by a processor, a request to evaluate the dependency graph for a requested frame of an animation;
    identifying, based on a temporal dependency list, that a value of the temporally dependent variable is dirty for a first frame different from the requested frame, wherein a value of the temporally dependent variable for the first frame is to be used to evaluate the dependency graph for the requested frame, and wherein the temporal dependency list comprises a list of values of the temporally dependent variable determined by previous evaluations of the dependency graph;
    in response to receiving the request to evaluate the dependency graph for the requested frame and in accordance with identifying that the value of the temporally dependent variable is dirty for the first frame, evaluating the temporally dependent variable for the first frame to generate a non-dirty value of the temporally dependent variable for the first frame;
    updating the list of values of the temporal dependency list based on the non-dirty value of the temporally dependent variable for the first frame; and
    evaluating at least a portion of the dependency graph at the requested frame based at least in part on the non-dirty value of the temporally dependent variable for the first frame from the updated list of values of the temporal dependency list.

2. The method of claim 1, wherein the temporal dependency list comprises a temporal dirty flag for each value in the list of values.

3. The method of claim 2, wherein identifying that the value of the temporally dependent variable is dirty comprises parsing the temporal dependency list to identify a set temporal dirty flag.

4. The method of claim 2, wherein updating the list of values of the temporal dependency list comprises:
    storing the non-dirty value of the temporally dependent variable for the first frame in the temporal dependency list; and
    resetting a temporal dirty flag for the identified dirty value.

5. The method of claim 1, wherein the temporally dependent variable is identified as being a temporally dependent variable by one or more nodes in the dependency graph.

6. The method of claim 1, further comprising, before receiving the request to evaluate the dependency graph at the requested frame:
    identifying the temporally dependent variable;
    generating the temporal dependency list;
    evaluating the dependency graph for one or more frames; and
    storing values of the temporally dependent variable resulting from the evaluating of the dependency graph for one or more frames in the temporal dependency list.

7. The method of claim 1, wherein evaluating at least the portion of the dependency graph at the requested frame is further based at least in part on a second non-dirty value of the temporally dependent variable for the requested frame.

8. A non-transitory computer-readable storage medium comprising computer-executable instructions for evaluating a dependency graph having a temporally dependent variable that is used to evaluate the dependency graph for a frame other than that at which the temporally dependent variable was evaluated, the computer-executable instructions comprising instructions for:
    receiving, by a processor, a request to evaluate the dependency graph for a requested frame of an animation;
    identifying, based on a temporal dependency list, that a value of the temporally dependent variable is dirty for a first frame different from the requested frame, wherein a value of the temporally dependent variable for the first frame is to be used to evaluate the dependency graph for the requested frame, and wherein the temporal dependency list comprises a list of values of the temporally dependent variable determined by previous evaluations of the dependency graph;
    in response to receiving the request to evaluate the dependency graph for the requested frame and in accordance with identifying that the value of the temporally dependent variable is dirty for the first frame, evaluating the temporally dependent variable for the first frame to generate a non-dirty value of the temporally dependent variable for the first frame;
    updating the list of values of the temporal dependency list based on the non-dirty value of the temporally dependent variable for the first frame; and
    evaluating at least a portion of the dependency graph at the requested frame based at least in part on the non-dirty value of the temporally dependent variable for the first frame from the updated list of values of the temporal dependency list.

9. The non-transitory computer-readable storage medium of claim 8, wherein the temporal dependency list comprises a temporal dirty flag for each value in the list of values.

10. The non-transitory computer-readable storage medium of claim 9, wherein identifying that the value of the temporally dependent variable is dirty comprises parsing the temporal dependency list to identify a set temporal dirty flag.

11. The non-transitory computer-readable storage medium of claim 9, wherein updating the list of values of the temporal dependency list comprises:
    storing the non-dirty value of the temporally dependent variable for the first frame in the temporal dependency list; and
    resetting a temporal dirty flag for the identified dirty value.

12. The non-transitory computer-readable storage medium of claim 8, wherein the temporally dependent variable is identified as being a temporally dependent variable by one or more nodes in the dependency graph.

13. The non-transitory computer-readable storage medium of claim 8, further comprising computer-executable instructions for:
- identifying, before receiving the request to evaluate the dependency graph at the requested frame, the temporally dependent variable;
- generating the temporal dependency list;
- evaluating the dependency graph for one or more frames; and
- storing values of the temporally dependent variable resulting from the evaluating of the dependency graph for the one or more frames in the temporal dependency list.

14. The non-transitory computer-readable storage medium of claim 8, wherein evaluating at least the portion of the dependency graph at the requested frame is further based at least in part on a second non-dirty value of the temporally dependent variable for the requested frame.

15. An apparatus for evaluating a dependency graph having a temporally dependent variable that is used to evaluate the dependency graph for a frame other than that at which the temporally dependent variable was evaluated, the apparatus comprising:
- a memory configured to store a temporal dependency list; and
- a computer processor configured to:
  - receive a request to evaluate the dependency graph for a requested frame of an animation;
  - identify, based on a temporal dependency list, that a value of the temporally dependent variable is dirty for a first frame different from the requested frame, wherein a value of the temporally dependent variable for the first frame is to be used to evaluate the dependency graph for the requested frame, and wherein the temporal dependency list comprises a list of values of the temporally dependent variable determined by previous evaluations of the dependency graph;
  - in response to receiving the request to evaluate the dependency graph for the requested frame and in accordance with identifying that the value of the temporally dependent variable is dirty for the first frame, evaluate the temporally dependent variable for the first frame to generate a non-dirty value of the temporally dependent variable for the first frame;
  - update the list of values of the temporal dependency list based on the non-dirty value of the temporally dependent variable for the first frame; and
  - evaluate at least a portion of the dependency graph at the requested frame based at least in part on the non-dirty value of the temporally dependent variable for the first frame from the updated list of values of the temporal dependency list.

16. The apparatus of claim 15, wherein the temporal dependency list comprises a temporal dirty flag for each value in the list of values.

17. The apparatus of claim 16, wherein identifying that the value of the temporally dependent variable is dirty comprises parsing the temporal dependency list to identify a set temporal dirty flag.

18. The apparatus of claim 16, wherein updating the list of values of the temporal dependency list comprises:
- storing the non-dirty value of the temporally dependent variable for the first frame in the temporal dependency list; and
- resetting a temporal dirty flag for the identified dirty value.

19. The apparatus of claim 15, wherein the temporally dependent variable is identified as being a temporally dependent variable by one or more nodes in the dependency graph.

20. The apparatus of claim 15, wherein the computer processor is further configured to:
- identify, before receiving the request to evaluate the dependency graph at the requested frame, the temporally dependent variable;
- generate the temporal dependency list;
- evaluate the dependency graph for one or more frames; and
- store values of the temporally dependent variable resulting from the evaluating of the dependency graph for one or more frames in the temporal dependency list.

21. The apparatus of claim 15, wherein evaluating at least the portion of the dependency graph at the requested frame is further based at least in part on a second non-dirty value of the temporally dependent variable for the requested frame.

* * * * *